(12) United States Patent
Mukkawar et al.

(10) Patent No.: US 12,515,534 B2
(45) Date of Patent: Jan. 6, 2026

(54) TORQUE-BOOST FOR ELECTRIFIED VEHICLE

(71) Applicant: FCA US LLC, Auburn Hills, MI (US)

(72) Inventors: Krishna Mukkawar, Pune (IN); Stephen Hyde, Waterford, MI (US); Karthik Valuri, Auburn Hills, MI (US); Preyash Hiteshkumar Shah, Brampton (CA); Godla Sagar Naidu, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 116 days.

(21) Appl. No.: 18/609,240

(22) Filed: Mar. 19, 2024

(65) Prior Publication Data

US 2025/0296450 A1    Sep. 25, 2025

(51) Int. Cl.
*B60L 15/20* (2006.01)
*B60K 35/10* (2024.01)

(52) U.S. Cl.
CPC .............. *B60L 15/20* (2013.01); *B60K 35/10* (2024.01); *B60L 2240/461* (2013.01); *B60L 2250/26* (2013.01)

(58) Field of Classification Search
CPC .............. B60L 15/20; B60L 2240/461; B60L 2250/26; B60K 35/10
See application file for complete search history.

(56) References Cited

U.S. PATENT DOCUMENTS

2022/0242251 A1*  8/2022  Oguro ................ B60L 15/2009

* cited by examiner

Primary Examiner — Yuen Wong
(74) Attorney, Agent, or Firm — Jeremy J. Klobucar

(57) ABSTRACT

An electrified powertrain that generates and transfers drive torque to a driveline of an electrified vehicle includes an electric motor, a driver interface and a controller. The driver interface has an accelerator pedal and a human machine interface that communicates a signal indicative of activating a torque-boost mode. The controller controls torque delivery based on an accelerator pedal map, the accelerator pedal map having (i) a first torque trace providing a maximum torque output based on a position of the accelerator pedal, and (ii) a second torque trace indicative of the torque-boost mode and providing a maximum torque-boost output based on the position of the accelerator pedal, the maximum torque-boost output being greater than the maximum torque output, wherein the controller commands the electric motor to operate at the maximum torque-boost output based on a driver activation input and a determination that the electrified vehicle is in motion.

17 Claims, 3 Drawing Sheets

TORQUE-BOOST FOR ELECTRIFIED VEHICLE

FIELD

The present application generally relates to electrified vehicles and, more particularly, to a control system and method for delivering increased drive torque to drive wheels of the electrified vehicle.

BACKGROUND

An electrified vehicle (hybrid electric, plug-in hybrid electric, range-extended electric, battery electric, etc.) includes at least one battery system and at least one electronic drive module having an electric motor and associated electric drive gearbox assembly. Typically, the electrified vehicle would include a high voltage battery system and a low voltage (e.g., 12 volt) battery system. In such a configuration, the high voltage battery system is utilized to power at least one electric motor configured on the vehicle and to recharge the low voltage battery system via a direct current to direct current (DC-DC) convertor. In some driving conditions it may be desirable to increase acceleration of the electrified vehicle, such as passing a slower vehicle, or achieving a faster acceleration from a standstill, or near standstill. However, the maximum available torque is typically predetermined based on acceleration pedal maps that provide maximum available torque based on accelerator pedal positions. These pedal maps can vary based on various conditions such as driving conditions and drive mode selection. Accordingly, while such acceleration profiles do work well for their intended purpose in electrified vehicles, there is a desire for improvement in the relevant art.

SUMMARY

According to one example aspect of the invention, an electrified powertrain that generates and transfers drive torque to a driveline of an electrified vehicle includes an electric drive module, a driver interface and a controller. The electric drive module includes an electric motor. The driver interface has an accelerator pedal and a human machine interface (HMI), the HMI configured to receive a driver input and communicate a signal indicative of activating a torque-boost mode. The controller controls torque delivery of the electric motor based on an accelerator pedal map, the accelerator pedal map having (i) a first torque trace providing a maximum torque output based on a position of the accelerator pedal, and (ii) a second torque trace indicative of the torque-boost mode and providing a maximum torque-boost output based on the position of the accelerator pedal, the maximum torque-boost output being greater than the maximum torque output, wherein the controller commands the electric motor to operate at the maximum torque-boost output based on a driver activation input and a determination that the electrified vehicle is in motion.

In some implementations, the driver activation input comprises an input from a human machine interface (HMI) indicative of a driver's desire to activate the torque-boost mode.

In some implementations, the HMI comprises a button.

In some implementations, the button is configured on a steering wheel of the electrified vehicle.

In some implementations, the controller controls torque delivery in the torque-boost mode based on a position of the accelerator pedal satisfying a threshold.

In additional aspects, the accelerator pedal threshold is 80% of a maximum pedal position.

In additional features, the controller permits torque delivery in the torque-boost mode based on a limited first timeframe subsequent to receiving the driver activation input.

In additional features, the controller permits torque delivery in the torque-boost mode based on a limited second timeframe subsequent to receiving the driver activation input and providing the maximum torque-boost output based on the position of the accelerator pedal satisfying the threshold.

In additional features, the controller determines that the electrified vehicle is in motion based on receiving a signal from a wheel speed sensor.

In additional features, activation of the torque-boost mode is based on satisfying at least one threshold related to motor torque capacity, battery power limit, temperature limit, driver assist system input, driver selected vehicle status and system faults.

According to one example aspect of the invention, a method for controlling drive torque to a driveline of an electrified vehicle having an electric motor is provided. The method includes receiving, at a controller, a driver activation signal from a human machine interface (HMI) indicative of activating a torque-boost mode; receiving, at the controller, an accelerator pedal signal from an accelerator pedal; controlling torque delivery of the electric motor based on an accelerator pedal map, the accelerator pedal map having (i) a first torque trace providing a maximum torque output based on the position of the accelerator pedal, and (ii) a second torque trace indicative of the torque-boost mode and providing a maximum torque-boost output based on the position of the accelerator pedal, the maximum torque-boost output being greater than the maximum torque output; and commanding the electric motor to operate at the maximum torque-boost output based on the driver activation signal and a determination that the electrified vehicle is in motion.

In additional features, commanding the electric motor to operate at the maximum torque-boost output based on the driver activation signal and a determination that the electrified vehicle is in motion.

In additional features, commanding the electric motor to operate at the maximum torque-boost output comprises: determining whether the position of the accelerator pedal satisfies a pedal position threshold; and operating at the maximum torque-boost output based on satisfying the pedal position threshold.

In additional features, the pedal position threshold comprises 80% of a maximum pedal position.

In additional features, the method further comprises, permitting torque delivery in the torque-boost mode based on a limited first timeframe subsequent to receiving the driver activation input.

In additional features, the method further comprises permitting torque delivery in the torque-boost mode based on a limited second timeframe subsequent to receiving the driver activation input; and providing the maximum torque-boost output based on the position of the accelerator pedal satisfying the threshold.

In additional features, commanding the electric motor to operate at the maximum torque-boost output is based on receiving a signal from a wheel speed sensor indicative of the electrified vehicle being in motion.

In additional features, activation of the torque-boost mode is based on satisfying at least one threshold related to motor torque capacity, battery power limit, temperature limit, driver assist system input, driver selected vehicle status and system faults.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As mentioned above, in some driving conditions it may be desirable to increase acceleration of an electrified vehicle, such as passing a slower vehicle, or achieving a faster acceleration from a standstill or near standstill. However, the maximum available torque provided by the electric motor is typically predetermined based on acceleration pedal maps that provide maximum available torque based on accelerator pedal positions. These pedal maps can vary based on various conditions such as driving conditions and drive mode selection. In examples, the maximum available torque in prior art arrangements is limited by the acceleration pedal maps to a level that is below a maximum capable torque of the electric motor.

The instant disclosure provides a torque-boost feature or mode that increases the maximum available torque upon activation. The maximum available torque increases the torque output delivered by the electric motor for a predetermined amount of time. The elevated torque can be triggered based on the torque-boost feature being activated by the driver and an accelerator pedal position exceeding a predetermined boost threshold accelerator pedal position.

Figure 1:
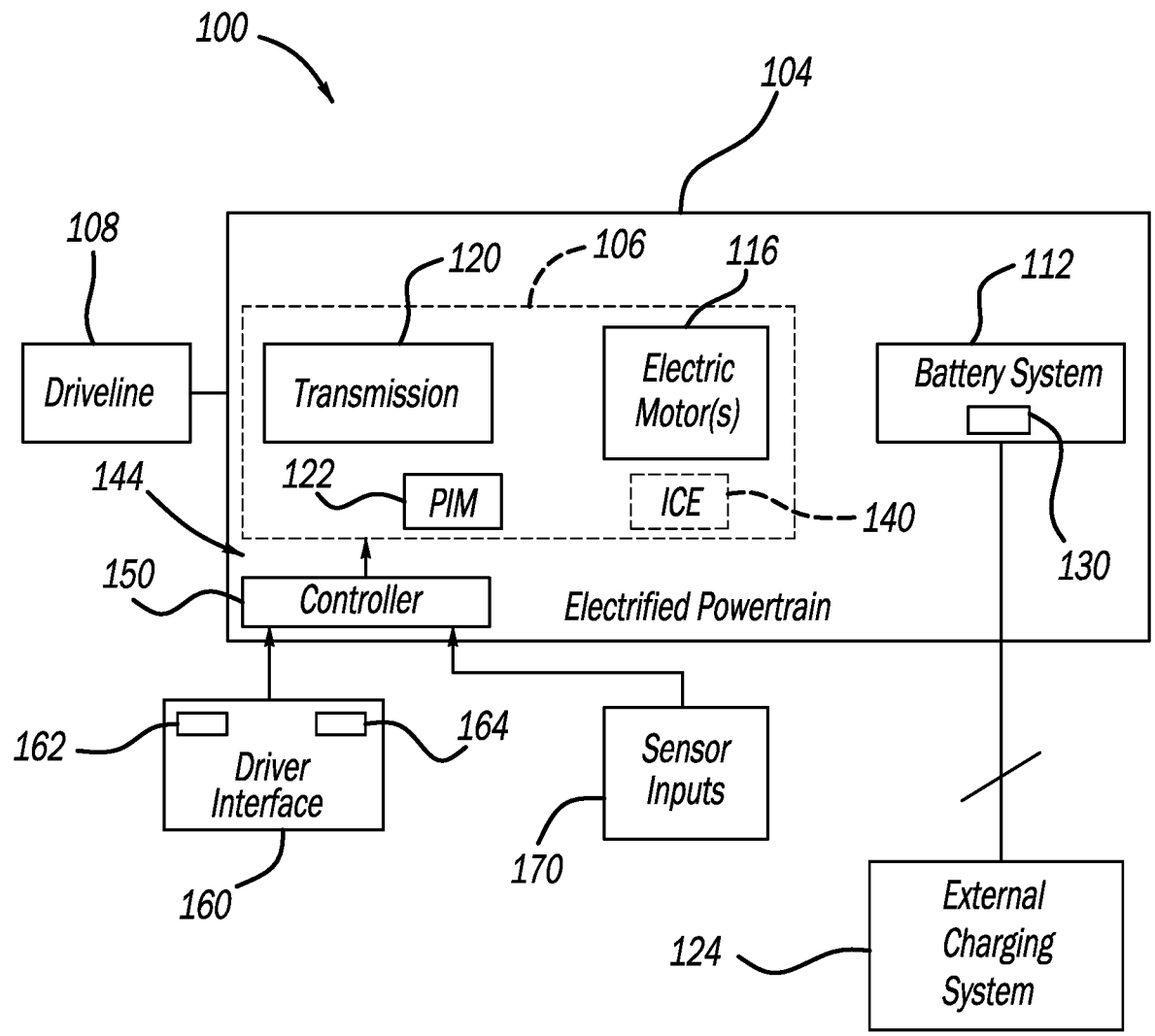
FIG. 1 is a functional block diagram of an electrified vehicle that implements a torque-boost feature according to various principles of the present application.

Referring now to FIG. 1, a functional block diagram of an example electrified vehicle 100 (also referred to herein as "vehicle 100") according to the principles of the present application is illustrated. The vehicle 100 includes an electrified powertrain 104 having an electric drive module (EDM) 106 configured to generate and transfer drive torque to a driveline 108 for vehicle propulsion. The EDM 106 generally includes one or more electric drive units or motors 116 (e.g., electric traction motors), an electric drive gearbox assembly or transmission 120, and power electronics including a power inverter module (PIM) 122.

The electric motor 116 is selectively connectable via the PIM 122 to a high voltage battery system 112 for powering the electric motor 116. The battery system 112 is selectively connectable (e.g., by the driver) to an external charging system 124 (also referred to herein as "charger 124") for charging of the battery system 112. The battery system 112 includes at least one battery pack assembly 130. In some examples, described herein, the electrified powertrain 104 can be a hybrid powertrain that additionally includes an internal combustion engine 140.

A vehicle control system 144 includes a controller 150 that can provide various inputs to the EDM 106 including torque requests based on signals received from a driver interface 160. In examples, the driver interface 160 can include a drive input device, e.g., an accelerator pedal 162, for providing a driver input, e.g., a torque request, to the controller 150 and ultimately the EDM 106. The driver interface 160 can further include a human machine interface (HMI) 164 for initiating the torque-boost feature. The HMI 164 can include any interface that receives an input from the driver indicative of a desire of the driver to activate the torque-boost feature such as a button or microphone (e.g. for receiving a voice command, etc.). In some examples, the HMI can be arranged on a steering wheel of the electrified vehicle 100.

While the vehicle control system 144 is shown as a single controller 150, it will be appreciated that more controllers and/or modules, such as a supervisory electric vehicle control module, a battery control module, a motor control module and a chassis stability module, can be utilized to control various vehicle components of the electrified vehicle 100. In this regard, various controllers and modules are configured to communicate with each other, utilizing different sensor inputs 170 and calculated parameters as disclosed herein for controlling operation of the torque-boost feature.

Figure 2:
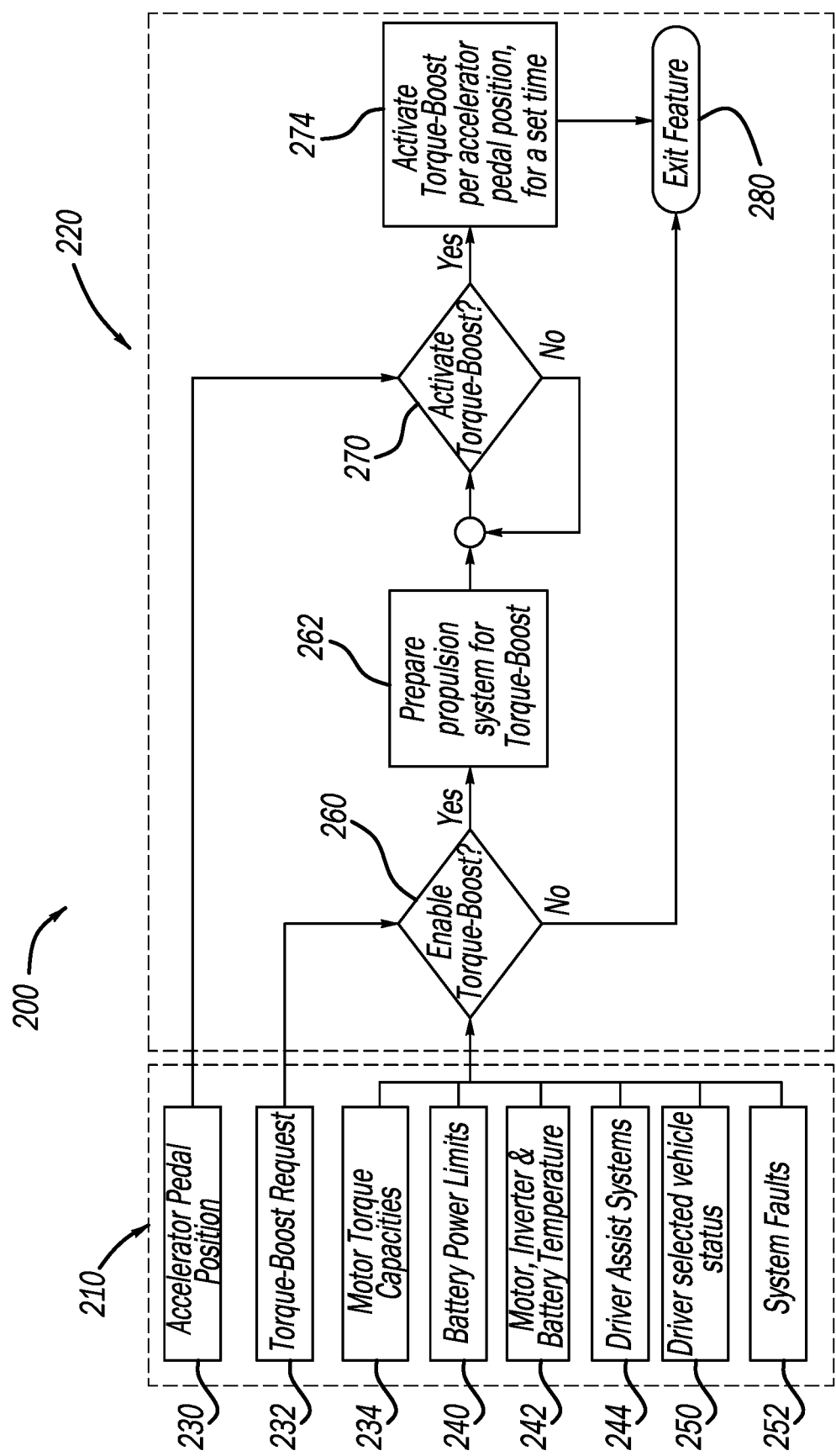
FIG. 2 is a schematic control architecture including a logic flow chart illustrating exemplary steps for implementing the torque-boost feature based on various vehicle inputs of the present disclosure.

With additional reference now to FIG. 2, a control architecture illustrating exemplary steps for implementing the torque-boost feature based on various vehicle inputs of the present disclosure is shown and generally identified at reference numeral 200. The control architecture 200 includes various vehicle inputs 210 and a logic control flow chart 220. In examples, the various inputs 210 are received at the controller 150 (FIG. 1) that executes the logic control flow.

The vehicle inputs 210 can include an accelerator pedal position input 230, a torque-boost request input 232, a motor torque capacities input 234, a battery power limit input 240, a motor, inverter and battery temperature input 242, a driver assist system input 244, a driver selected vehicle status input 250 and a system fault input 252. It is appreciated that additional inputs may be used by the controller 150 for providing the torque-boost feature.

The logic control flow 220 will now be described. At 260, control determines whether torque-boost has been enabled. The torque-boost can be enabled such as at the driver interface 160. In examples, the torque-boost can be enabled in response to an input at the human machine interface (HMI) 164. According to implementations of the present disclosure, the torque-boost request 232 can also be dependent upon the electrified vehicle 100 being in motion. In other words, the torque-boost request can be initiated based on the electrified vehicle already travelling or having a non-zero speed. In this regard, sensor inputs 170 can include wheel speeds or other inputs indicative of the vehicle moving and not being at a complete stop.

In additional examples, control verifies conditions of the electrified vehicle 100 to allow the torque-boost feature to be enabled. Such conditions can include determinations if one or more of the inputs 210 satisfy predetermined thresholds.

System thresholds can be set and compared to the motor torque capacities input 234, battery power limit input 240, motor, inverter and battery temperature input 242, driver assist system input 244 and system faults input 252. As can be appreciated if one (or more) inputs does not satisfy a predetermined threshold, the torque-boost feature is not enabled at 260 and control ends at 280.

If control verifies the conditions of the electrified vehicle 100 satisfy the predetermined thresholds, control prepares the propulsion system for torque-boost at 262. In examples, control prepares the electrified powertrain 104 for torque-boost based on the enable criteria being satisfied at 260. At 270, control determines whether to activate torque-boost. Control receives the position input 230 of the accelerator pedal 162 at 270 and determines whether to activate the torque-boost. In examples, the position of the accelerator pedal 162 must satisfy a predetermined percentage, such as 80%, as will be further discussed below with respect to FIG. 3. If control determines that conditions are satisfied to activate torque-boost at 270, control activates torque-boost at 274. Torque-boost is based on a position of the accelerator pedal 162 as will be described in relation to FIG. 3 below.

In additional examples, the torque-boost is available only for a predetermined timeframe. Explained further, after torque-boost is requested at the driver interface 160, control sets a limited first timeframe allowed (activation ready window) for the driver to activate torque-boost. Further, once torque-boost is active or torque-boost is being delivered, it is available only for a limited second timeframe (activation delivery window). By non-limiting examples, the predetermined first and second timeframes can be 5 seconds, 10 seconds, 20 seconds, 30 seconds or other timeframes. The torque-boost features is exited when either of the first and second timeframes expire. It is appreciated that the first and second timeframes can be equivalent or different from each other.

Figure 3:
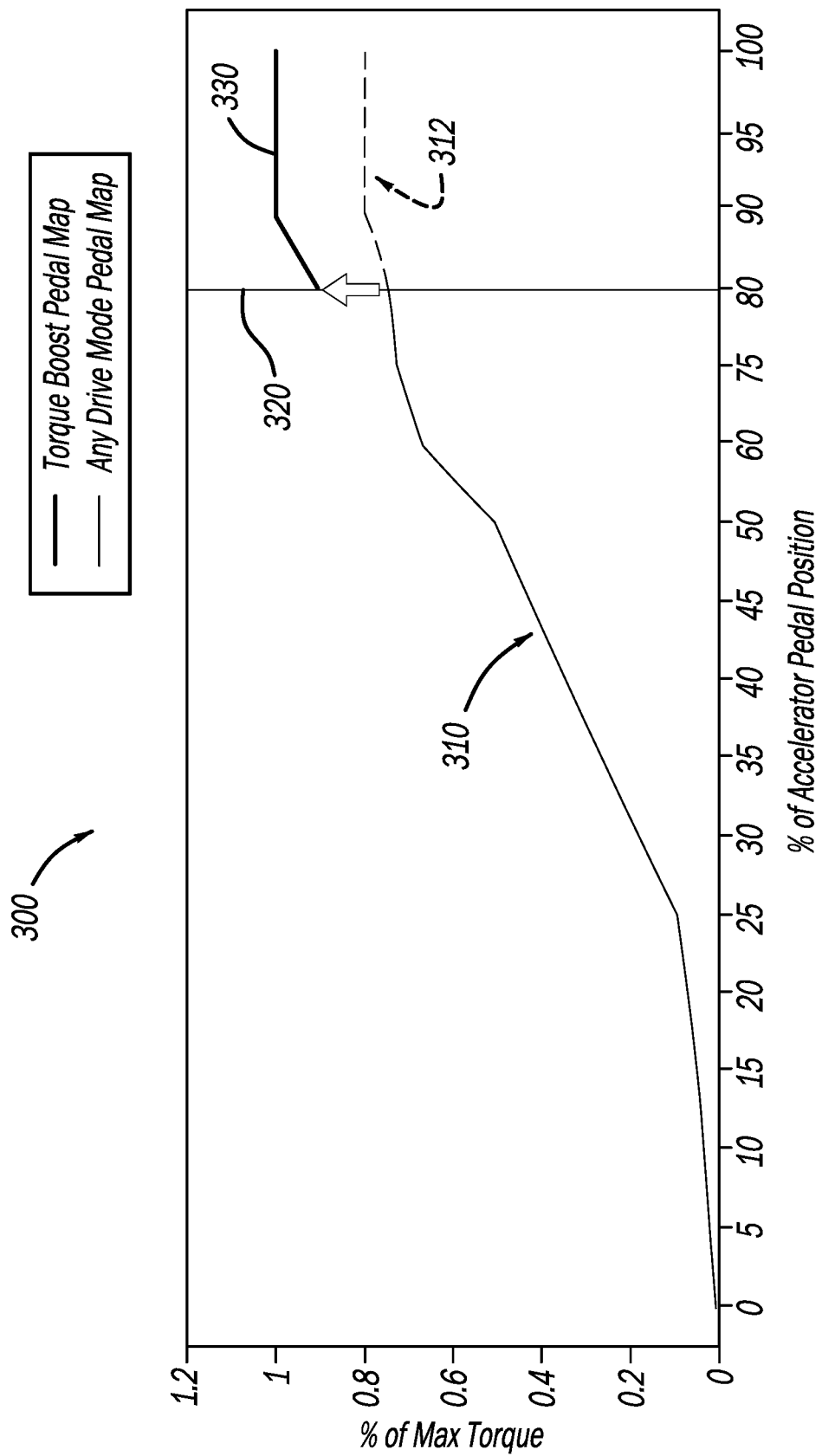
FIG. 3 is an accelerator pedal map illustrating percent of maximum torque versus accelerator pedal position for a conventional drive mode and also illustrating a torque-boost pedal map available upon activation of the torque-boost feature of the present disclosure.

Turning now to FIG. 3, an accelerator pedal map 300 illustrating percent of maximum torque versus accelerator pedal position is shown. The accelerator pedal map 300 includes a first trace 310 that represents any drive mode pedal map. As can be appreciated, electrified vehicles operate in many drive modes (sport mode, off-road mode, valet mode, etc.) that may include unique pedal maps. While only the map 300 is shown, control may have a plurality of different acceleration pedal maps that are followed based on the selected drive mode. Once the torque-boost feature of the present disclosure is enabled at 274, the percentage of maximum available torque increases once the accelerator pedal 162 exceeds a predetermined position (in this example 80%, however other percentages are contemplated).

Using the exemplary accelerator pedal map of FIG. 3, once the accelerator pedal position crosses an enable position (80%), the maximum available torque is increased to follow a torque-boost trace 330. By way of comparison, the maximum torque now follows the elevated trace 330 as compared to a previously available maximum torque trace 312 that would have been followed based on the first trace 310. It is appreciated that other maximum torque percentages can be available upon activation of the torque-boost mode.

The torque-boost feature can elevate driver engagement and satisfaction by enabling them to activate this feature whenever is needed to achieve the desired acceleration resulting in added driver excitement and an enhanced driver experience.

As used herein, the term controller or module refers to an application specific integrated circuit (ASIC), an electronic circuit, a processor (shared, dedicated, or group) and memory that executes one or more software or firmware programs, a combinational logic circuit, and/or other suitable components that provide the described functionality.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified powertrain that generates and transfers drive torque to a driveline of an electrified vehicle, the electrified powertrain comprising:
    an electric drive module having an electric motor;
    a driver interface having an accelerator pedal and a human machine interface (HMI), the HMI configured to receive a driver input and communicate a signal indicative of activating a torque-boost mode; and
    a controller having a processor configured to control torque delivery of the electric motor based on an accelerator pedal map, the accelerator pedal map having (i) a first torque trace providing a maximum torque output based on a position of the accelerator pedal, and (ii) a second torque trace indicative of the torque-boost mode and provide a maximum torque-boost output based on the position of the accelerator pedal, the maximum torque-boost output being greater than the maximum torque output,
    wherein the controller commands the electric motor to operate at the maximum torque-boost output based on a driver activation input and a determination that the electrified vehicle is in motion.

2. The electrified powertrain of claim 1, wherein the driver activation input comprises an input from a human machine interface (HMI) indicative of a driver's desire to activate the torque-boost mode.

3. The electrified powertrain of claim 2, wherein the HMI comprises a button.

4. The electrified powertrain of claim 3, wherein the button is configured on a steering wheel of the electrified vehicle.

5. The electrified powertrain of claim 1, wherein the controller controls torque delivery in the torque-boost mode based on a position of the accelerator pedal satisfying a threshold.

6. The electrified powertrain of claim 5, wherein the accelerator pedal threshold is 80% of a maximum pedal position.

7. The electrified powertrain of claim 5, wherein the controller permits torque delivery in the torque-boost mode based on a limited second timeframe subsequent to receiving the driver activation input and providing the maximum torque-boost output based on the position of the accelerator pedal satisfying the threshold.

8. The electrified powertrain of claim 1, wherein the controller permits torque delivery in the torque-boost mode based on a limited first timeframe subsequent to receiving the driver activation input.

9. The electrified powertrain of claim 1, wherein the controller determines that the electrified vehicle is in motion based on receiving a signal from a wheel speed sensor.

10. The electrified powertrain of claim 1, wherein activation of the torque-boost mode is based on satisfying at least one threshold related to motor torque capacity, battery power limit, temperature limit, driver assist system input, driver selected vehicle status and system faults.

11. A method for controlling drive torque to a driveline of an electrified vehicle having an electric motor, the method comprising:
   receiving, at a controller having a processor, a driver activation signal from a human machine interface (HMI) indicative of activating a torque-boost mode;
   receiving, at the controller, an accelerator pedal signal from an accelerator pedal;
   controlling torque delivery of the electric motor based on an accelerator pedal map, the accelerator pedal map having (i) a first torque trace providing a maximum torque output based on the position of the accelerator pedal, and (ii) a second torque trace indicative of the torque-boost mode and providing a maximum torque-boost output based on the position of the accelerator pedal, the maximum torque-boost output being greater than the maximum torque output; and
   commanding the electric motor to operate at the maximum torque-boost output based on the driver activation signal and a determination that the electrified vehicle is in motion.

12. The method of claim 11, wherein commanding the electric motor to operate at the maximum torque-boost output comprises:
   determining whether the position of the accelerator pedal satisfies a pedal position threshold; and
   operating at the maximum torque-boost output based on satisfying the pedal position threshold.

13. The method of claim 12, wherein the pedal position threshold comprises 80% of a maximum pedal position.

14. The method of claim 12, further comprising:
   permitting torque delivery in the torque-boost mode based on a limited first timeframe subsequent to receiving the driver activation input.

15. The method of claim 14, further comprising:
   permitting torque delivery in the torque-boost mode based on a limited second timeframe subsequent to receiving the driver activation input; and
   providing the maximum torque-boost output based on the position of the accelerator pedal satisfying the threshold.

16. The method of claim 11, wherein commanding the electric motor to operate at the maximum torque-boost output is based on receiving a signal from a wheel speed sensor indicative of the electrified vehicle being in motion.

17. The method of claim 11, wherein activation of the torque-boost mode is based on satisfying at least one threshold related to motor torque capacity, battery power limit, temperature limit, driver assist system input, driver selected vehicle status and system faults.

* * * * *